United States Patent Office 3,327,522
Patented June 27, 1967

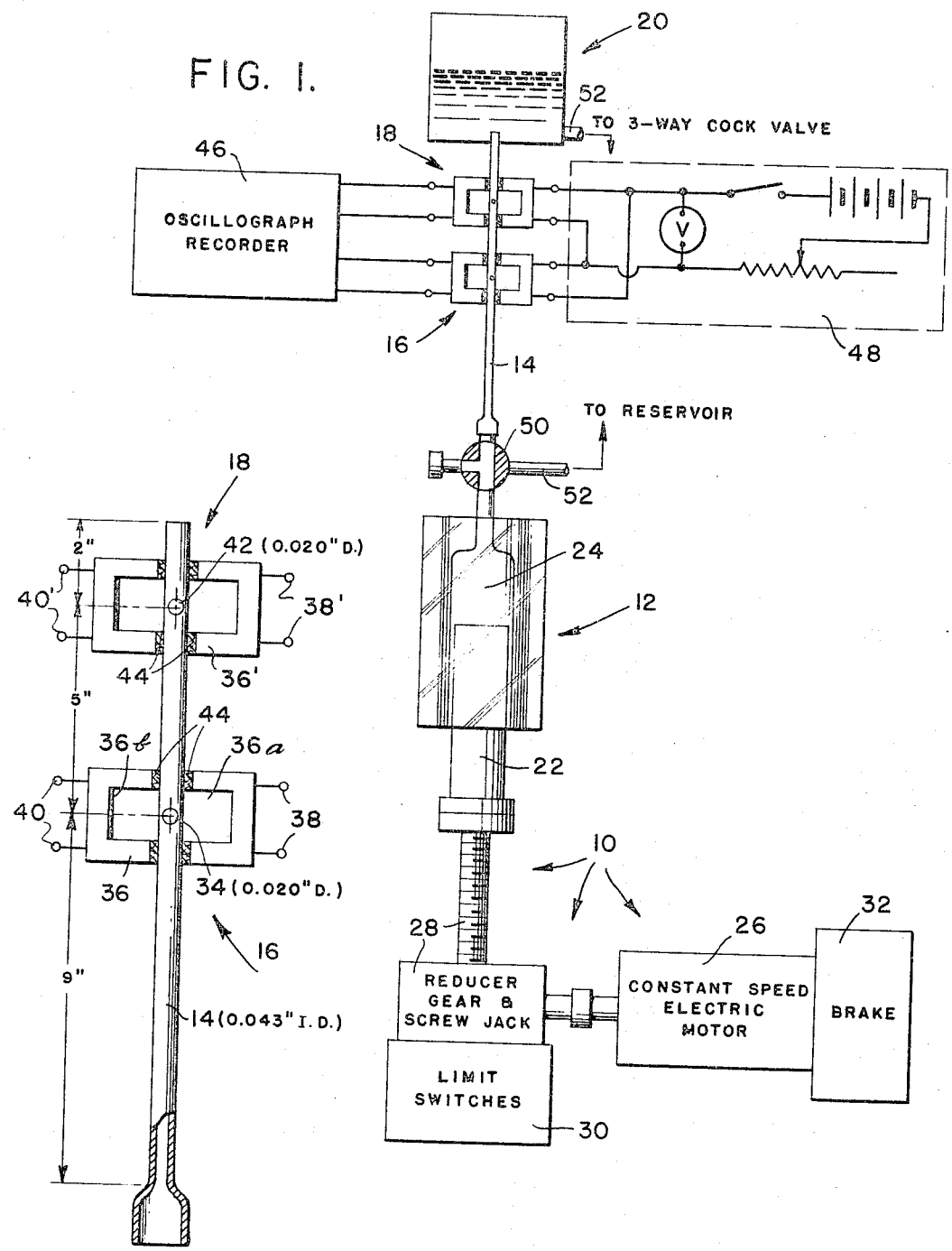

3,327,522
TURBULENT FRICTION MEASUREMENT
Jack W. Hoyt, Pasadena, Calif., assignor to the United States of America as represented by the Secretary of the Navy
Filed May 17, 1965, Ser. No. 456,579
2 Claims. (Cl. 73—55)

The invention described herein may be manufactured and used by or for the Government of the United States of America for governmental purposes without the payment of any royalties thereon or therefor.

The invention relates to methods for determining friction properties of liquids under turbulent flow conditions.

In the art of propulsion of water vehicles certain water soluble polymers are now being employed which are added to the boundary layer of the vehicle for reducing the skin friction. The study of the characteristics of these polymers has been impeded since most known friction property measuring apparatuses measure only the laminar flow conditions, rather than flow under turbulent conditions. While some apparatuses have been devised for determining characteristics under turbulent flow conditions, such as the forcing of liquids through full size test piping by a rotary pump or a pressurized gas source, this apparatus has suffered the disadvantage of considerable bulk and the requirements that large samples be employed. Also, where the rotary pump or high pressure gas source is used to force the liquid through the test piping, changed turbulent friction characteristics due to the polymer addition in the liquid will require different pump rotative speeds or different air pressure settings to achieve the same flow velocity as with the pure base liquid. In the latter instances, either the apparatus adjustments must be made, or interpolation techniques must be employed to determine the effect of the polymer solution as compared with the pure base liquid at the same flow velocity.

Accordingly, an object of the invention is to provide an improved method for determining turbulent flow friction characteristics of certain fluids, which methods require only a small sample, and by which the turbulent flow characteristics of different fluids may be determined from a single, uniform procedure and without the need for complex extrapolation of test data.

Other objects, advantages and novel features of the invention will become apparent from the following detailed description of the invention when considered in conjunction with the accompanying drawings wherein:

FIG. 1 is a diagrammatic of the invention; and
FIG. 2 is an enlarged view of a detail of FIG. 1.

Referring now to the drawing and in particular to FIG. 1, the invention comprises, in general, a constant speed linear actuator mechanism 10, a plunger type pump 12, and a length of tube 14 having a very small internal diameter. For example, in one highly successful embodiment of the invention, tube 14 has an inner diameter of 0.043″. A pair of pressure measuring stations 16 and 18 are disposed along the length of tube 14. The entire apparatus is mounted vertically and the upper end of tube 14 extends through the bottom of a reservoir cup 20, and opens into the interior of the cup.

The pump's plunger element 22 enters the pump cylinder 24 from its bottom end. Linear actuator mechanism 10 consists of a constant speed motor 26 and a reducer gear and screw jack device 28 to move the plunger upward into the cylinder at a predetermined rate of motion. This rate of motion is chosen to force the contents of the cylinder through thin tube 14 at sufficiently high average flow velocity to produce tubulent flow conditions therein. The equation setting forth the criterion for turbulent flow is as follows:

$$Re = \frac{vD}{\gamma}$$

wherein $Re$ = Reynolds number
$v$ = average flow velocity in the pipe
$D$ = pipe diameter
$\gamma$ = kinematic viscosity of liquid If the Reynolds number is greater than approximately 2000, the flow is commonly spoken of as being turbulent. However, it has been found that the manifestation of changed turbulent skin friction properties are usually more pronounced at higher Reynolds numbers of the order of 14,000, and therefore the rate of movement of the plunger is preferably sufficiently high to produce the latter order of value of Reynolds number. There is a further criterion in the design of actuator mechanism 10. Forcing liquid through pipe 14 produces a predetermined load on the plunger, which may be determined by conventional calculations. Constant speed motor 26 has a sufficient high power rating that its speed is essentially not affected by differences in load as between different specimen liquids. For example, a ½ horsepower motor was employed in the mentioned embodiment in which tube 14 has a 0.043 inner diameter. It can be shown that the power of such motor is approximately 100 times that required for the load upon plunger 22 in forcing distilled water through the tube at the desired rate of movement. Alternatively, the linear actuator may be driven by a synchronous speed motor, the important criterion being the fluctuations in speed under changing load conditions are negligible so that the rate of flow of liquid through tube 14 is essentially fixed and uniform irrespective of differences in turbulent skin friction characteristic of the tested specimen liquids. A suitable limit switch device 30 and motor brake 32 are provided to control the stroke of plunger 22.

The lower pressure measurement station 16 is disposed approximately 200 pipe diameters along the length of tube 14 from its lower end, in order to ensure fully developed flow conditions at the point of measurement. Station 16 comprises small orifice 34, FIG. 2, bored through the wall of tube 14. Orifice 34 is encased by a hydrostatic pressure chamber and transducer unit 36, which forms a small hydrostatic chamber 36a and includes a pressure sensing element, symbolically represented by dark strip 36b. The pressure sensing element is of the conventional type which produces an output signal by means of a resistance bridge arrangement, not shown. Unit 36 has a pair of electrical bias input terminals 38, connecting to the reference side of the bridge, and a pair of terminals 40 connecting to the output side of the bridge. The upper pressure measurement station 18 is disposed downstream (upward in the drawing) from lower station 16 by a distance chosen to provide an adequate difference in measured pressure between the stations. It comprises an orifice 42 and pressure chamber and sensor unit 36′ like unit 36. Suitable packings 44, shown diagrammatically, are provided to maintain liquid tight and pressure tight engagement between tube 14 and the structure of units 36, 36′. The pressure output signal from terminal 40 and 40′ are applied as separate recording channels to a conventional oscillograph recorder 46. An adjustable bias network 48, including a voltmeter, is provided for applying a common reference voltage to the reference side of the resistance bridges in units 36 and 36′. In the mentioned embodiment having a 0.043″ inner diameter tube, orifices 34 and 42 are 0.020″ in diameter and are disposed 9.0″ and 14.0″ along the length of the tube from its lower end. These dimensions are shown in connection with FIG. 2 of the drawing.

An arrangement for introducing the specimen liquid into pump cylinder 24 consists of a three way valve 50 and a fill pipe 52. Three way valve 50 has it vertically aligned ports connected between the outlet of plunger 12, and the bottom end of tube 14. Fill pipe 52 consists of a larger diameter tube connected from a drain opening near the bottom of reservoir cup 20, to one of the horizontally aligned ports of three way valve 50. The other horizontally aligned port is capped.

In operation, a small sample of the specimen liquid is placed in cup 20. The rotary element of three way valve 50 is moved to its position in which the T channel in the rotary element communicates the fill pipe 52 and the outlet of plunger pump 12. This allows the specimen liquid to drain from the cup through fill pipe 52 into the pump cylinder. After the cylinder is filled, the rotary element of the three way valve is returned to its position communicating the pump outlet with tube 14. Motor 32 is started, which causes the uniform rate of upward movement of the plunger 22, forcing liquid through pipe 14 and producing turbulent flow conditions within the bore of the tube at the measuring stations. The pressures within the bore of tube 14 at these stations are communicated to the hydrostatic chamber and pressure transducer units 36, 36'. The pressures in these chambers are sensed and applied as separate channels on the recording paper of oscillograph recorder 46. When the plunger reaches the end of its stroke, the limit switch device 30 turns motor 26 off and its rotation is stopped by brake 32. It will be readily apparent that the arrangement for filling the pump cylinder permits convenient repeated measurements of the same sample for checking reproducibility of results.

The remaining procedure then consists of determining the average pressure difference between stations 16 and 18 from the recording paper of oscillograph recorder 46, and applying it to the following formula:

$$A\left(1-\frac{B}{C}\right)$$

or $$A \text{ (percentage)} = \left(1-\frac{B}{C}\right)100$$

wherein $A$ = a figure of merit for purpose of comparison of turbulent friction reduction properties of a specimen liquid.
$B$ = the measured average pressure differential for the specimen of liquid under test.
$C$ = the measured pressure differential for the reference liquid.

The following example is given to show the practical operation of the invention:

| Fluid | Pressure (Station 16) p.s.i. | Pressure (Station 18) p.s.i. | Difference, p.s.i. |
|---|---|---|---|
| Distilled Water | 32.4 | 15.5 | 36.9 |
| Water containing 100 parts per million polyethylene oxide | 19.7 | 5.6 | 14.1 |

$A$ (Percentage) = $\left(1-\frac{14.1}{36.9}\right)100 = 61.6\%$.

What is claimed is:

1. A method for determining a comparison coefficient representing a quantitative measure of turbulent flow drag friction properties of a specimen fluid relative to that of a reference fluid, such as distilled water, said method comprising the steps of:
    (a) delivering said specimen to the delivery end of an elongated pipe at a predetermined rate of flow, said predetermined rate of flow and the length to internal bore diameter of the pipe being chosen to provide fully developed turbulent flow along a predetermined linear portion of the bore of the pipe, said rate of flow being essentially fixed and uniform irrespective of difference in the turbulent flow drag friction characterized of the specimen and reference fluids,
    (b) measuring the pressure differential between two spaced pressure sensing stations disposed along said predetermined linear portion of the pipe within which turbulent flow is fully developed, and
    (c) comparing the measured differential for the specimen fluid to that of the reference fluid under the same condition in accordance with the relationship $$A = \left(1-\frac{B}{C}\right)$$

where A is the desired coefficient representing a quantitative measure of turbulent flow drag friction properties of the specimen fluid, B is the measured pressure differential for the specimen fluid, and C is the measured pressure differential for the reference fluid.

2. A method in accordance with claim 1 wherein the first pressure measuring station in the down stream direction is spaced at least 100 pipe internal bore diameters along the pipe from its delivery end.

References Cited

UNITED STATES PATENTS 2,459,483  1/1949  Zimmer et al. _____ 73—55
2,503,660  4/1950  Exline et al. _____ 73—56

DAVID SCHONBERG, *Primary Examiner.*